United States Patent
Bloom et al.

(10) Patent No.: US 7,415,128 B2
(45) Date of Patent: *Aug. 19, 2008

(54) METHOD AND APPARATUS FOR PROVIDING AN ASYMMETRIC WATERMARK CARRIER

(75) Inventors: Jeffrey Adam Bloom, West Windsor, NJ (US); John Scott Nafziger, Morrisville, PA (US)

(73) Assignee: Transpacific Information, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/098,954

(22) Filed: Apr. 5, 2005

(65) Prior Publication Data

US 2005/0175216 A1    Aug. 11, 2005

Related U.S. Application Data

(63) Continuation of application No. 10/872,921, filed on Jun. 21, 2004, now Pat. No. 6,885,757, which is a continuation-in-part of application No. 10/124,995, filed on Apr. 18, 2002.

(60) Provisional application No. 60/479,661, filed on Jun. 19, 2003.

(51) Int. Cl.
    *G06K 9/00*    (2006.01)

(52) U.S. Cl. .................................................... 382/100
(58) Field of Classification Search ................ 382/100, 382/232; 713/176; 380/28, 54; 348/61, 348/461

See application file for complete search history.

(56) References Cited

U.S. PATENT DOCUMENTS

| 6,778,678 | B1 | 8/2004 | Podilchuck et al. | |
| 2002/0076083 | A1* | 6/2002 | Levy | 382/100 |
| 2002/0090110 | A1 | 7/2002 | Braudway et al. | |
| 2004/0064702 | A1* | 4/2004 | Yu et al. | 713/176 |

OTHER PUBLICATIONS

Gonzalez et al. Digital Image Processing, 2nd Edition. Prentice-Hall, 2002, pp. 42-45.*

* cited by examiner

*Primary Examiner*—Colin LaRose
(74) *Attorney, Agent, or Firm*—McDonnell Boehnen Hulbert & Berghoff LLP

(57) ABSTRACT

A low-frequency, temporally asymmetric watermark carrier decreases in luminance at a slower rate than it increases in luminance. This allows the carrier to be embedded, e.g., in a video work, in a manner that renders the resultant watermark virtually invisible to the human eye. Moreover, the resultant watermark is substantially resistant to common pirating techniques in which high-frequency visual content (e.g., including watermark data) tends to be filtered out by piracy processing.

32 Claims, 8 Drawing Sheets

METHOD AND APPARATUS FOR PROVIDING AN ASYMMETRIC WATERMARK CARRIER

CROSS REFERENCE TO RELATED APPLICATIONS

This application is a continuation of U.S. patent application Ser. No. 10/872,921, filed Jun. 21, 2004 now U.S. Pat. No. 6,885,757 by Bloom et al. (entitled "Method And Apparatus For Providing An Asymmetric Watermark Carrier"), which is in turn a continuation-in-part of U.S. patent application Ser. No. 10/124,995, filed Apr. 18, 2002 by Bloom et al. (entitled "Secure Robust High-Fidelity Watermarking"), both of which are herein incorporated by reference in their entireties. application Ser. No. 10/872,921 also claims the priority of U.S. Provisional Patent Application No. 60/479,661, filed Jun. 19, 2003 (entitled "Asymmetric Watermark Carrier"), which is herein incorporated by reference.

REFERENCE TO GOVERNMENT FUNDING

This invention was made with Government support under Contract Number NIST 70NANB1H3036. The Government has certain rights in this invention.

FIELD OF THE INVENTION

The present invention relates generally to video processing, and relates more particularly to the insertion and recovery of watermark data into and from video works.

BACKGROUND OF THE INVENTION

A major barrier to the development and deployment of distribution channels for motion imagery content (e.g., video download, digital cinema) is the concern of content providers that their copyrighted material may be copied and subsequently distributed without appropriate authorization. Encryption is an important component of a Digital Rights Management (DRM) approach to controlling access to the content. However, once access has been granted, the decrypted content is left unprotected. Thus, encryption alone cannot prevent all instances of theft. Persistent access control methods that rely on proprietary file formats and the use of compliant devices have been proposed, but ultimately all video content must be converted to pixel brightness and color for display. At this point, video is vulnerable.

Given these potential leaks, a content owner needs forensic tools that enable the tracking of unauthorized copies back to the party who licensed the use of the content and who was responsible for preventing its further distribution. The ability of content owners to identify the exact distribution point at which material was pirated can be used as a tool to identify the responsible parties and can act as a deterrent to such theft. A watermark (e.g., a superimposed pattern on the digital imagery content) can uniquely identify, in the content itself, the licensee of that particular copy of the content, thereby providing content owners with a powerful tool against piracy.

According to SMPTE DC28.4 for Download Watermarks and Exhibition Watermarks, a watermark used for purchaser identification should: (a) satisfy the high-fidelity requirements of the content owners; (b) be robust to the combination of exhibition capture and compression; and (c) be secure against unauthorized removal and/or embedding. Unfortunately, no single watermark technology has demonstrated simultaneously acceptable performance in terms of fidelity, robustness and security.

Thus, there is a need in the art for a method and apparatus for providing asymmetric watermark carrier.

SUMMARY OF THE INVENTION

In one embodiment, a low-frequency, temporally asymmetric watermark carrier decreases in luminance at a slower rate than it increases in luminance. This allows the carrier to be embedded, e.g., in a video work, in a manner that renders the resultant watermark virtually invisible to the human eye. Moreover, the resultant watermark is substantially resistant to common pirating techniques in which high-frequency visual content (e.g., including watermark data) tends to be filtered out by piracy processing.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

As described above, a desirable watermarking method if one that provides sufficiently high levels of robustness, fidelity and security, where the phrase "sufficiently high" is a relative term that varies with specific applications.

Figure 1:
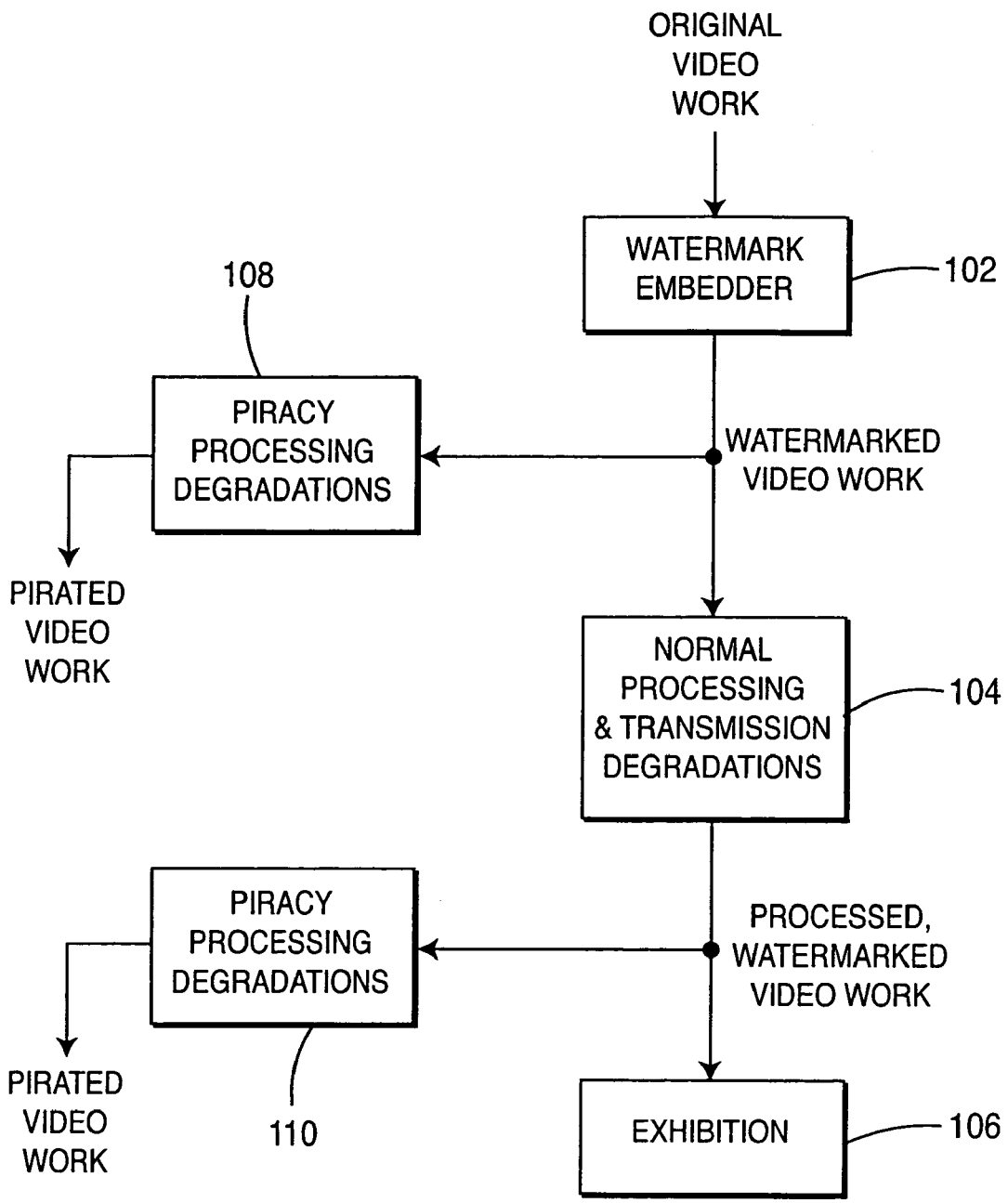
FIG. 1 is a block diagram representing video piracy of a watermarked video work.

FIG. 1 is a block diagram representing video piracy of a watermarked video work. As shown in FIG. 1, an original video work is processed by a watermark embedder 102 to produce a watermarked video work. The watermarked video work is a modified version of the original video work such that the modification introduced by the watermark embedder 102 represents certain watermark data.

The fidelity of a watermarking method relates to the degradation in the visual quality of the original video work caused by the watermark embedding process. The fidelity of the method is defined as the fidelity of the watermarked video work with respect to the original video work. Many watermarking applications require that the degradation caused by processing in the watermark embedder 102 is completely or at least substantially invisible to the human eye.

There are a number of normal processing and transmission degradations 104 to which the watermarked video is likely to be exposed prior to exhibition 106. These degradations 104 may include compression, color space conversion, digital-to-analog conversion and the like. Upon misappropriation of the watermarked work (e.g., via unauthorized copying or unauthorized capture), the watermarked video work may be further subjected to piracy processing degradations 110, as described in further detail below. Piracy degradations associated with unauthorized copying 108 may include, for example, very low bit-rate compression.

A typical example of unauthorized capture is the recording of a movie by a video camcorder during an authorized exhibition (e.g., in a movie theater). Piracy processing degradations 110 associated with unauthorized capture of video content include degradations introduced by the camcorder or recording/capture medium, which may further include one or more degradations such as geometric transformations (e.g., rotation, skew, perspective distortion, temporal and/or spatial stretching, and the like), filtering, cropping, introduction of occlusions, luminance non-linearity and the like.

Following unauthorized copying or capture, a pirated work is likely to be compressed at a relatively low bit rate for storage, e.g., on a video CD, or for distribution, e.g., over the Internet. Such compression typically results in further degradation including resolution reduction and compression artifacts (e.g., blocking).

The robustness of a watermarking method relates to the likelihood that the watermark data can be recovered from a pirated video work, e.g., in order to identify the origin of the video work or the likely time and/or place that the piracy occurred. It is assumed that the pirated video work is a version of the watermarked video work that has been further subjected to normal processing and transmission degradations, piracy processing degradations, or both.

For many common applications, a watermarking method is considered sufficiently robust if the watermark data survives typical levels of these kinds of degradations during video processing normally associated with video content piracy, where survival means that enough of the watermark data can be recovered from the pirated version of the video work to be useful in identifying a time and/or place at which the piracy occurred.

The security of a watermarking method relates to the difficulty of performing the watermarking process (e.g., embedding and/or removal) without explicit authorization. A watermark is typically considered secure against unauthorized watermark embedding if it is computationally infeasible for a party to embed valid watermark data into a video work without knowledge of a secret (e.g., a secret watermark key analogous to a secret cipher key used in cryptography). Embedding valid watermark data means modifying a video work such that an uncompromised watermark detector would extract the data and deem it valid.

A watermarking method is secure against unauthorized watermark removal if it is computationally infeasible for a party to modify a watermarked video work such that the watermark data cannot be reliably recovered without introducing sufficient visual distortion so as to render the resulting video work worthless. Unauthorized watermark removal includes erasure of watermark data, modifications to a watermarked video work that inhibit proper functioning of a watermark detector, embedding of spurious watermark data such that a detector cannot reliably distinguish between valid and invalid data (e.g., "jamming"), and the like.

Figure 2:
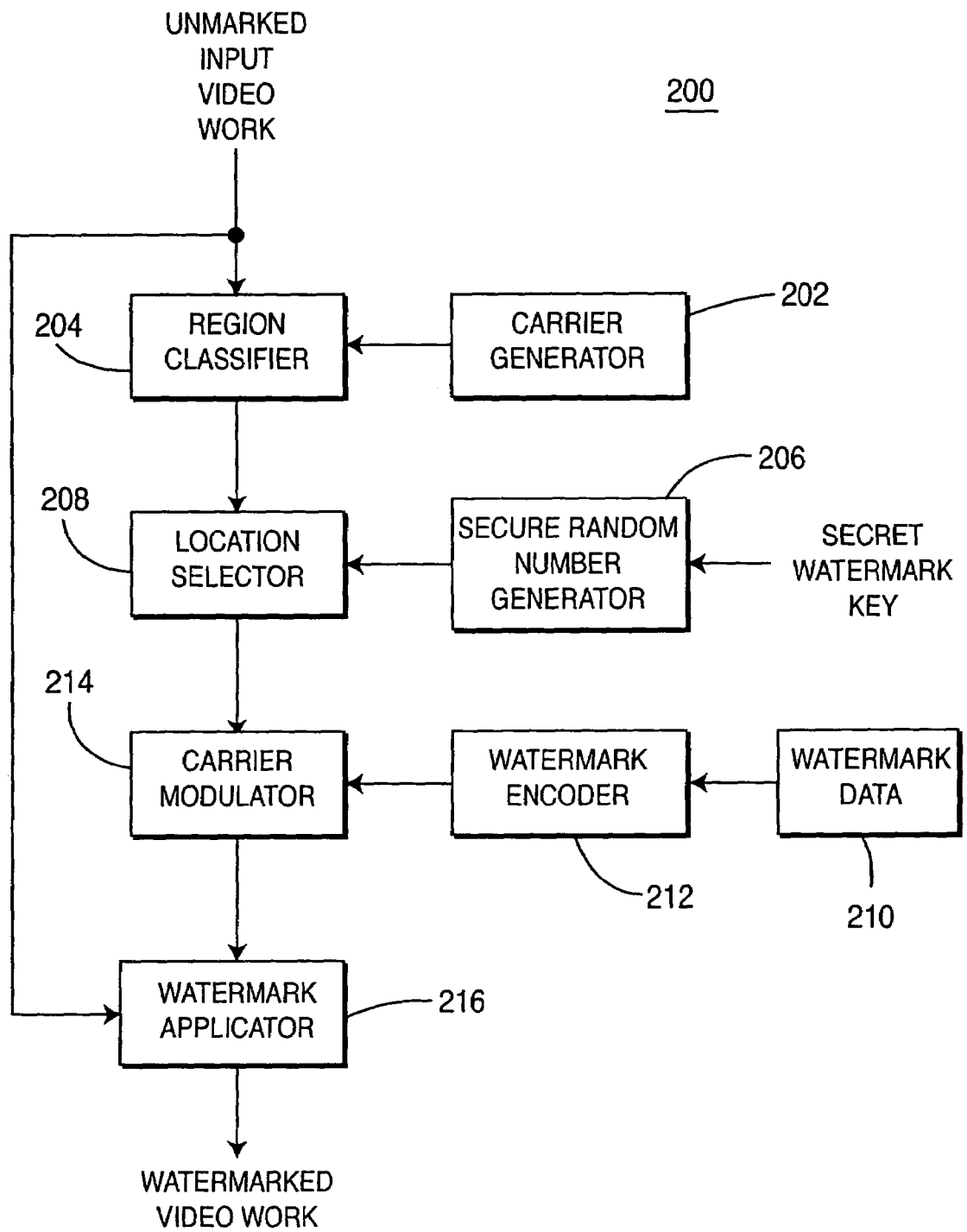
FIG. 2 is a block diagram of a watermark insertion system, according to one embodiment of the present invention.

FIG. 2 is a block diagram of a watermark insertion system 200, according to one embodiment of the present invention. The watermark insertion system 200 is configured to encode watermark data into the content (e.g., the actual image data) of an input video work in a manner that achieves satisfactory levels of robustness, fidelity and security, as described above.

The watermarking method employed by the watermarking insertion system 200 involves a two-step process: an analysis step followed by a selection/insertion step. The analysis step involves the identification of different available spatio-temporal locations within a video work for the insertion of suitable watermark carriers that are to be used to encode the watermark data. The selection/insertion step involves: (1) the selection of specific locations from the available locations identified in the analysis step; and (2) the insertion of the watermark data at the selected locations using corresponding watermark carriers.

In one embodiment, the analysis step is performed once, off-line, for each original (e.g., unmarked) video work, while the selection/insertion step is performed in real time each time a different set of watermark data is to be embedded in a different copy of the original video work. For example, in the case of exhibition of a particular movie at different movie theaters, the input video work corresponds to the original, unmarked movie. Each time the movie is exhibited at a movie theater, a unique set of watermark data is encoded into the video content, where that watermark data might be intended to uniquely identify the particular exhibition. Thus, the watermark data may contain information that indicates the particular theater, date and/or time at which the exhibition took place, serial numbers of the associated decryption, decompression, and exhibition devices, global positioning system (GPS) coordinates of the playback equipment, and the like.

Referring to FIG. 2, the analysis step is implemented by a carrier generator 202 and a region classifier 204 of the watermark insertion system 200. The carrier generator 202 generates one or more suitable watermark carriers for use in encoding watermark data into the input video work. In one embodiment, a "carrier" is a robust, imperceptible, localized pattern that can support modulation to encode watermark data. The one or more different watermark carriers generated by the carrier generator 202 may be based on different types of modulation (e.g., amplitude, frequency, phase and the like) and different magnitudes.

A video work may be considered as a three-dimensional (3D) spatio-temporal "volume" (x, y, t) of video data, wherein two of the three dimensions (x, y) correspond to the height and width (e.g., in terms of pixels) within each video picture (e.g., frame or field), and the third dimension (t) corresponds to time (e.g., in terms of numbers of consecutive video pictures). For example, a digital video bitstream corresponding to a two-hour movie having thirty frames per second (fps) with (600×800) pixels per frame corresponds to a video volume that is 600 pixels high by 800 pixels wide by 216,000 frames long (having (x, y, t) coordinates of (600, 800, 216, 000).

One possible type of watermark carrier used to encode watermark data into the video volume of an input video work corresponds to a relatively small 3D volume having a height, a width and a duration where each pixel in the watermark volume has a specified value (which could be positive, negative or zero). For example, the 3D volume for a particular watermark carrier could be thirty pixels high, forty pixels wide and 150 frames long (e.g., corresponding to a duration of five seconds in a thirty fps video stream), where each pixel in the 3D watermark carrier has a specific integer value. To embed a bit of coded watermark data in an input video work, the watermark carrier is modulated based on the value of the data bit, and the resulting modulated watermark carrier is then applied, pixel by pixel, to a corresponding set of pixels in the video volume of the input video work, where the corresponding set of pixels in the video volume may be identified, for example, by the location of its center pixel (e.g., x, y coordinates in frame t). The 3D volume occupied by a watermark carrier need not necessarily be a contiguous set of pixels. In one embodiment, the 3D volume is a number of disjoint sets of pixels.

In one embodiment, if the bit of encoded watermark data has a logical "1" (one") value, then the pixels of the 3D watermark carrier are added, pixel by pixel, to the corresponding pixels in the 3D video stream. If the bit of watermark data has a logical "0" (zero") value, then the pixels of the 3D watermark carrier are subtracted from the corresponding pixels in the 3D video stream. In another embodiment, a logical "1" bit is encoded in the manner described above, while a logical "0" value is "encoded" by leaving the corresponding pixels in the original 3D video stream unchanged. Those skilled in the art will appreciate that other permutations of these described modulation schemes may be implemented without departing from the scope of the present invention.

In one embodiment, a 3D watermark carrier is based on a one-dimensional Gaussian function whose peak value is located at the center of the 3D carrier pattern, in which the values of the pixels in the 3D volume corresponding to the watermark carrier start at or near zero in the first "frame" of the watermark volume, increase in a Gaussian manner towards the frame located at the center of the watermark volume, and then decrease in a Gaussian manner towards the last frame in the watermark volume, where, within each frame of the 3D watermark carrier, all of the pixel values are the same and where the peak value is a positive value corresponding to the amplitude of the Gaussian function. In one embodiment, the addition of such a Gaussian watermark carrier into a video work would correspond to a gradual lightening of a rectangular area in the video display, followed by a gradual darkening of the same rectangular area. If the carrier pattern is of sufficient duration, and if the amplitude of the Gaussian function is not too large, then the gradual lightening and subsequent darkening of the display should be substantially invisible to the viewer (except, perhaps, at the boundaries of the rectangular area). In another embodiment, the watermark carrier is designed not as a spatial rectangle, but is rather configured with a boundary that corresponds to the edges in the original video work, so that the modulated watermark carrier is substantially invisible. In one embodiment, where a modulation scheme in which a logical "0" is encoded by subtracting the watermark carrier from the video work, the subtraction of the Gaussian watermark carrier will correspond to a gradual darkening of the encoded area, followed by a gradual lightening.

In another embodiment, a 3D watermark carrier is a 3D spatio-temporal Gaussian function having a peak value at some specified (x, y, t) location and whose amplitude falls off not only in time in each direction, but also outward in space as well.

In one embodiment, a 3D watermark carrier can be any 3D set of pixel values, whether the set forms a uniform pattern (e.g., such as those based on a Gaussian function) or any other possible pattern. The suitability of a particular set of pixel values as a watermark carrier will depend on the whether the resultant watermark carrier satisfies the robustness, fidelity and security requirements for the application in which it is to be deployed, as described previously herein.

In further embodiments, a suitable watermark carrier is one that could be inserted invisibly on its own, but would create visible artifacts upon subsequent insertion of additional, overlapping watermarks. In one embodiment, the strength of the visible artifacts would increase with every overlapping watermark inserted. For example, physiological and psychophysical literature on "sub-threshold summation" suggests that groupings of spatially proximate carriers, especially carriers arranged into simple visual patterns (e.g., bars and edges), will produce visual effects that tend to increase with the sum of signal energy across the group.

The carrier generator 202 generates one or more suitable watermark carriers for a particular application. As described above, the characteristics of a suitable watermark carrier will vary from application to application. For example, watermark carriers that are suitable for use in a movie theater exhibition may differ from carriers that are suitable for tracking down Internet-based pirates. Furthermore, suitability may also differ with the type of video content being marked. For example, watermark carriers that are suitable for use in full-color motion imagery may differ from carriers that are suitable for use in a gray-scale video slide show consisting of a sequence of black and white photographs.

Depending on the particular application, the carrier generator 202 may generate suitable watermark carriers based purely on objective criteria, or the carrier generator 202 may rely on subjective data (e.g., actual feedback from human subjects). In one embodiment, the carrier generator 202 is implemented separately and off-line. In one embodiment, the carrier generator 202 subjects a relatively large set of potential carriers to analyses (e.g., simulation of a complete imaging system) that reveal which carriers (and with what levels and kinds of modulation) would be robust within the intended domain or application. For example, an application that requires robustness to low-quality camcorder capture may be restricted to lower frequency watermark carriers than an application that requires robustness to moderate bit rate compression.

In one embodiment, the carrier generator 202 performs an analysis of likely degradations in terms of their effects on spatio-temporal components of the content (e.g., spatio-temporal frequencies) and identifies those components that are likely to be substantially unaffected by the degradations (e.g., very low spatio-temporal frequencies). In one embodiment, other forms of analysis are performed, including one or more of spatial, temporal, spatio-temporal and wavelet decompositions, among others. In one embodiment, analysis involves decomposing an input signal (e.g., an original video work) into a plurality of components to determine which signal components are likely to be substantially unaffected by the expected degradations, including one or more piracy processing degradations (e.g., degradations 108 or 100 of FIG. 1) in addition to normal processing and/or transmission degradations (e.g., 104 in FIG. 1).

Analysis such as that described above has identified very low spatio-temporal frequency watermark patterns, including those based on the 3D Gaussian patterns described previously herein, as suitable watermark carriers. In some embodiments, very low spatio-temporal frequency watermark patterns are those having frequencies below the peak of the spatio-temporal contrast sensitivity function described in D. H. Kelley, "Motion and Vision, II. Stabilized Spatio-Temporal Threshold Surface," J. Opt. Soc. Of Am., 69(10), pp. 1340-1349, 1979, the teachings of which are incorporated herein by reference. In a more particular embodiment, the watermark patterns should have frequencies at least an order of magnitude below that at the peak.

Region classifier 204 identifies, for each watermark carrier generated by the carrier generator 202, potential locations (in the 3D volume corresponding to the input video work) where the watermark carrier could be "invisibly" inserted into the video work (e.g., taking into account both logical "1" and logical "0" modulation of that watermark carrier), but where the insertion of additional carriers (e.g., by someone attempting to jam the watermark signal) would create visible artifacts. In one embodiment, the region classifier 204 performs the just noticeable different (JND) analysis described in U.S. Pat. No. 6,137,904, the teachings of which are herein incorporated by reference. In general, other suitable perceptual models can be implemented by the region classifier 204 to identify potential locations for the watermark carriers based on the content of the input video work.

In one embodiment, the region classifier 204 divides the input video stream into a plurality of 3D regions in the 3D video volume, where each 3D region corresponds to a subset of the input video stream. For example, in an implementation that uses 3D watermark carriers of size (30 pixels×40 pixels× 150 frames), each region could represent a different video "sub-volume" (e.g., 600 pixels×800 pixels×300 frames) corresponding to a different ten-second sequence in the thirty fps input video stream. In one embodiment, the region classifier 204 determines whether each watermark carrier generated by the carrier generator 202 satisfies the above-mentioned JND criterion at each location within each region of the input video stream.

Figure 3:
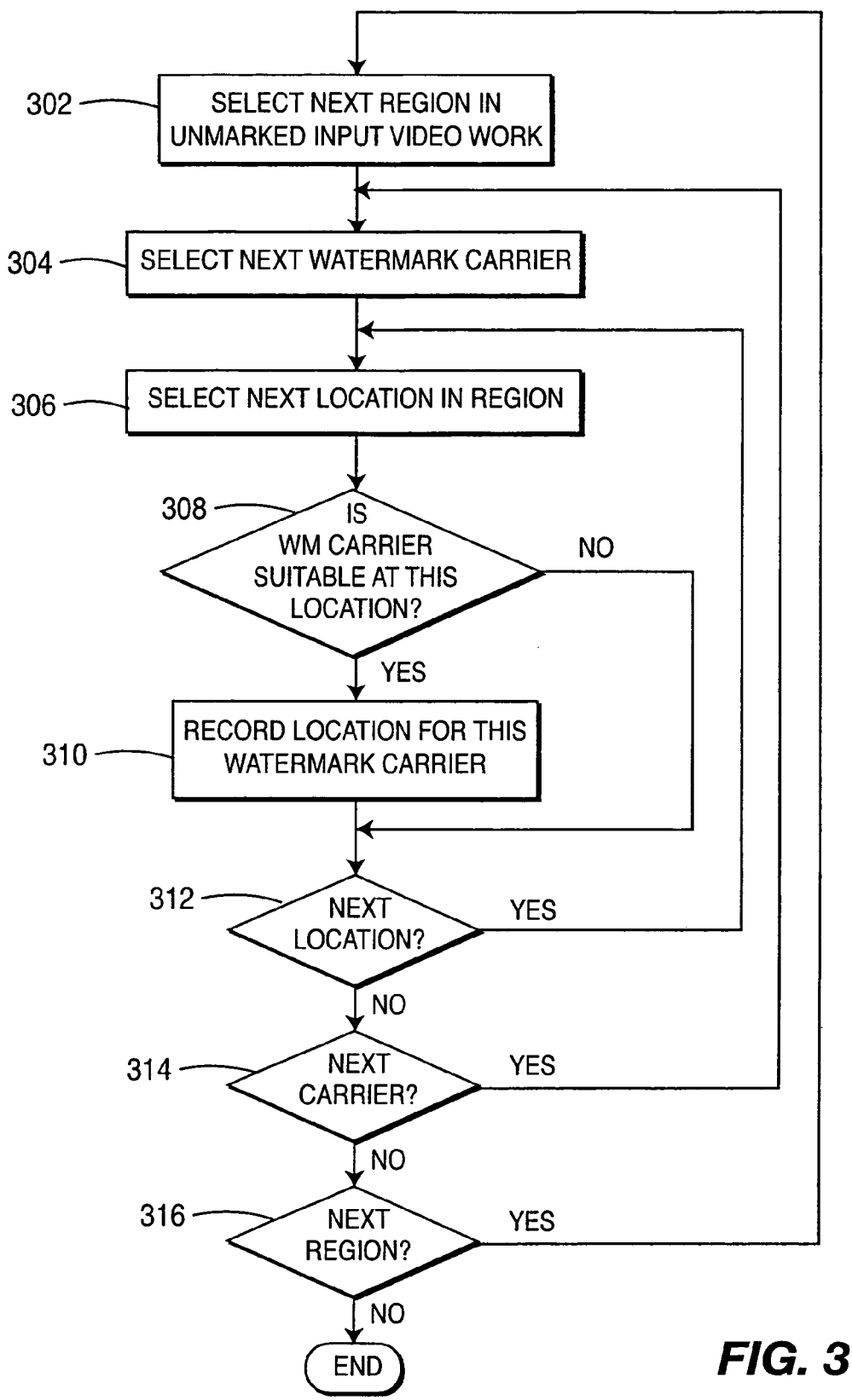
FIG. 3 is a flow diagram of one possible implementation of the processing implemented by the region classifier of FIG. 2.

FIG. 3 is a flow diagram of one possible implementation of the processing implemented by the region classifier 204 of FIG. 2. This implementation involves three nested loops: an outer loop for sequentially selecting each different region of the input video work (steps 302 and 316); and intermediate loop for sequentially selecting each different watermark carrier generated by the carrier generator 202 (steps 304 and 314); and an inner loop for sequentially selecting each different location within the currently selected region (steps 306 and 312). Within the inner loop, JND analysis is performed to determine whether the JND criterion would be satisfied if the currently selected watermark carrier were inserted (based on either logical "1" or logical "0" modulation) at the currently selected location in the currently selected region of the input video work (step 308). If the JND criterion would be satisfied by insertion of the currently selected watermark carrier at the currently selected location, then the information about the current location and the current watermark carrier is recorded for subsequent processing (step 310).

For a given watermark carrier and a given region, there are a finite number of different locations where the watermark carrier can be inserted into the region. In one embodiment, the region classifier 204 tests every location. In another embodiment, the region classifier 204 tests only a subset of those locations (e.g., locations separated from one another by a specified distance in the 3D video space).

The processing method illustrated in FIG. 3 identifies, for each region in the input video work, a set of available locations for inserting corresponding watermark carriers. For implementations involving two or more different watermark carriers, the region classifier 204 identifies both the available locations and the particular watermark carriers associated with those locations. Note that, for such implementations, the region classifier 204 may identify two or more different watermark carriers as being suitable for insertion at a single location. Such a result does not mean that multiple watermarks could be inserted invisibly at that location, but that any one of the two or more different watermark carriers could be invisibly inserted on its own at the given location.

In typical video content, if a watermark carrier can be inserted invisibly at a particular location in the video work (based on the relative characteristics of both the watermark carrier and the particular location in the video work), then the probability is high that that same watermark carrier could instead be inserted invisibly into nearby locations in the video work. Similarly, if a watermark carrier cannot be inserted invisibly at a particular location, then the probability is high that that same watermark carrier could not be inserted invisibly into nearby locations. Furthermore, if a particular watermark carrier can, or cannot, be inserted invisibly into a particular location in the video work, then the probability is high that similar watermark carriers could, or could not, be inserted invisibly into the same location. As a result, the processing method illustrated in FIG. 3 will typically produce higher-density and lower-density distributions of available locations throughout each region, with clusters of available locations appearing in the results, as opposed to a uniform distribution of available locations.

In one embodiment, the processing method illustrated in FIG. 3 only needs to be performed once (e.g., during off-line, non-real-time processing) for each different input video work. The results are recorded for use during the subsequent selection/insertion step, which is executed each time a different set of watermark data is to be inserted into a different copy of the original input video work.

In one embodiment, the selection/insertion step (i.e., the second part of the watermarking method performed by the watermark insertion system 200) involves the embedding of only a single bit of coded watermark data into each region of the input video work that was analyzed in the processing method depicted in FIG. 3. In this case, for each region, only one of the available locations is selected and a single bit of coded watermark data is used to modulate the corresponding watermark carrier for insertion at the selected location. Other embodiments may support the embedding of more than one bit of coded watermark data into each region of the input video work. In these cases, the region classifier 204 may also perform some "post-processing" of the information generated during the processing method illustrated in FIG. 3.

In order to increase the security of the watermarking method, it may be desirable to select one or more of the available locations in each region for insertion of watermark carriers based on the relative densities in the distribution of the available locations in the region. In certain situations, security can be increased by inserting watermark carriers at high-density locations. The motivation for such a case is described in further detail below.

In order to jam the watermark data in a watermarked video work, a pirate might try to insert jamming patterns at each of the available locations in the video work. It is expected that by purposely inserting watermark carriers into high-density locations, it will be harder it harder for a pirate to effectively jam the watermark data without creating visible artifacts in the jammed video work. In this case, the region classifier 204 could perform optional post-processing involving a cluster analysis that characterizes and identifies clusters of available locations in the results generated during the processing method illustrated in FIG. 3. A different watermark carrier could then be inserted into each cluster. Another part of this post-processing phase could involve the imposition of a minimum distance between clusters of available locations to ensure that different watermark carriers do not overlap with one another in the watermarked video work.

Once the region classifier 204 completes the analysis step (i.e., the first part of the watermarking method performed by the insertion system 200), the selection/insertion step is performed. In one embodiment, the selection/insertion step involves: (1) the selection of one or more different locations and their corresponding watermark carriers from among the available locations in each region of the video work identified during the analysis step; (2) the encoding of the watermark data to produce the coded watermark data; and (3) the embedding of the coded watermark data into the input video work by modulating each selected watermark carrier by a different bit of the coded watermark data and applying the modulated watermark carriers to the input video work.

Referring back to FIG. 2, in order to achieve security, a secure random number generator 206 uses a secret (e.g., private) watermark key to generate a random (or at least pseudo-random) sequence of values that is used by a location selector 208 to select one or more of the available locations in each region of the input video work. A watermark encoder 212 encodes the watermark data 210 for improved robustness. Robustness encoding may include redundant coding, error correction coding (e.g., trellis coding), encryption and the like. The use of encryption can increase the security of the watermarking method against unauthorized embedding. A carrier modulator 214 modulated the watermark carrier associated with each of the selected locations by a different bit of coded watermark data. The resulting modulated watermark carriers are the applied to the input video work by a watermark applicator 216 to generate the watermarked video work. In one embodiment, the watermark applicator 216 adds the modulated carriers to the input video work. However, other techniques, including multiplication and mixing, may be employed, as described in M. L. Miller, I. J. Cox and J. A. Bloom, "Informed Embedding: Exploiting Image and Detector Information During Watermark Insertion," Proceedings of the IEEE International Conference on Image Processing, Vol. 3, pp. 1-4, 2000, and in U.S. Pat. No. 6,128,736, both of which are herein incorporated by reference. Because only a fraction of the available locations in the input video work are actually used to represent watermark data, and because those selected locations are secret (i.e., are not known to video pirates), a relatively high level of security against unauthorized erasure can be achieved.

Every time a different set of watermark data is inserted into a different copy of the input video work, a different secret watermark key may be used to generate a unique sequence of values used to select from among a predetermined set of available locations. Although using a different key for each different set of watermark data is not necessary, doing so may ensure that the set of locations at which the watermark data is inserted into the input video will differ for each differently watermarked version of the input video work, which can enhance the security of the watermarking method against unauthorized embedding and unauthorized removal.

Figure 4:
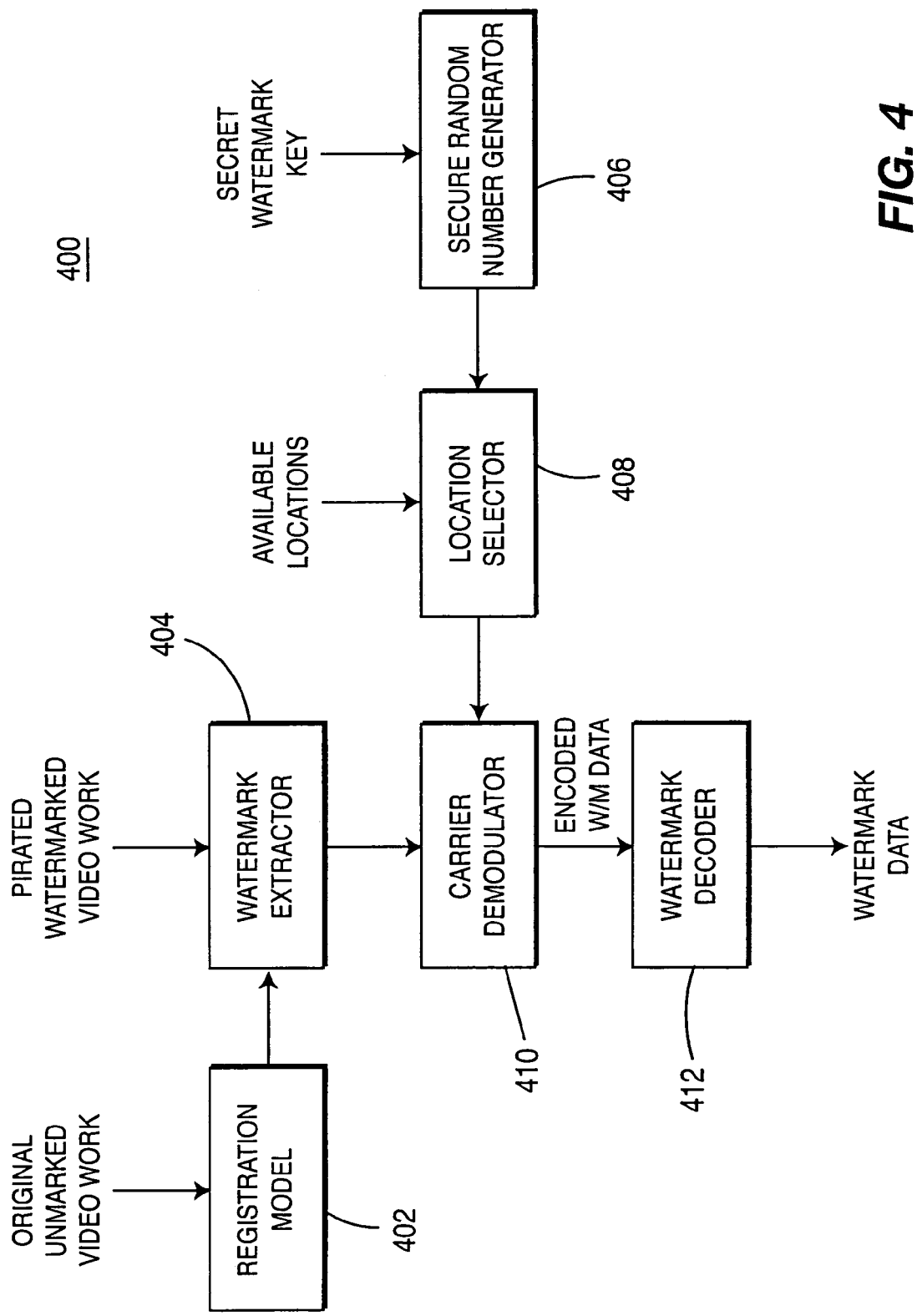
FIG. 4 is a block diagram of a watermark recovery system, according to one embodiment of the present invention.

FIG. 4 is a block diagram of a watermark recovery system 400, according to one embodiment of the present invention. The recovery system 400 can be used to decode the watermark data from a pirated version of a watermarked video work. As shown in FIG. 4, the recovery system 400 optionally passes a copy o the original (e.g., unmarked) video work (i.e., substantially identical to the input video work of FIG. 2) through a registration model 402. The purpose of this step is to align the distorted (e.g., pirated) video more closely to the reference video in space, time and gray level, so that a sequence of difference images between the reference and distorted video will produce as clean a trace as possible of the inserted watermarks. The particular processing implemented by the registration model 402 will depend on the particular type of activities involved in generating the pirated video work. For example, if the pirated video work is a low bit rate video stream, then the registration model 402 could perform gray-scale registration and resizing only, to bring the spatial dimensions and gray-scale range of the pirated and original content into alignment. Alternatively, if the pirated video work was generated using a video camera to record the exhibition of a movie at a movie theater, then geometric transformations may also be required to bring the pirated content into alignment. The registration process need not be automatic; in one embodiment, registration is performed under the direction of a human operator.

In one embodiment, the registration process may include any one or more of spatial, temporal, frequency, color, brightness or contrast registration, and the registration process is intended to ensure that the pixel-by-pixel subtraction operation is performed on corresponding pixels in the two video works (e.g., the pirated work and the reference work). This is especially important when the pirated video work was generated using a video camera.

The watermark extractor 404 extracts a watermark pattern by subtracting the reference video work from the pirated video work. The extracted watermark generated by the watermark extractor 404 corresponds to a noisy map of all of the embedded modulated watermark carriers. The coded watermark data can be recovered from this noisy map using a number of different techniques, depending on how much information about the processing performed by the watermark insertion system 200 is available to the watermark recovery system 400. In particular, the different sets of information about the processing performed by the watermark insertion system 200 include one or more of the following: the original, unmarked video work, the one or more watermark carriers generated by the carrier generator 202, the sets of available locations for the one or more watermark carriers identified by the region classifier 204, the secret watermark key applied to the random number generator 206, the random number sequence generated by the random number generator 206, the locations selected by the location selector 208, the set of watermark data 210, the set of coded watermark data output by the watermark encoder 212, the secret key used by the watermark encoder 212 to encrypt the watermark data, and the watermarked video work generated by the watermark applicator 216.

Depending on the particular implementation, one or more of these different sets of information is recorded during the processing of the watermark insertion system 200 for use by the recovery system 400 in recovering the watermark data from the pirated video work.

At one extreme is a situation in which the recovery system 400 has minimal knowledge from the processing of the watermark insertion system 200. For example, in one exemplary implementation, the only information available to the recovery system 400 is the original, unmarked video work and the one or more watermark carriers generated by the carrier generator 202. In this case, a possible "brute force" technique would be to apply a matched filter for each of the different modulated watermark carriers to the noisy map generated by the watermark extractor 404 to find the best matches, where each match would indicate a different bit of recovered coded watermark data. In one embodiment, this technique would require a modulation scheme in which both logical "1"'s and logical "0"'s were explicitly embedded into the input bit stream by applying modulated watermark carriers (as opposed, for example, to the implicit encoding of logical "0"'s by leaving the original video content unchanged at specified locations).

An opposite extreme case is one in which maximal information from the watermark insertion process is available to the recovery system 400. This cases involves the recording of each location and its corresponding watermark carrier selected during location selection (e.g., step 208 of FIG. 2), as well as the coded watermark data output by the watermark encoder 212 used to modulate the selected watermark carriers in the carrier modulator 214 during the watermark insertion processing of each input video work. The noisy map generated by the watermark extractor 404 could then be analyzed using each recorded set of information corresponding to each time a different set of watermark data was encoded into a copy of the input video work to determine which set of watermark data most closely matches the noisy map.

Other possible watermark recovery methods require less information from the watermark insertion system 200. For example, the watermark data could be recovered based on a recorded set of information that included only the selected locations and their corresponding watermark carriers (e.g., without necessarily recording the coded watermark data itself), by generating the two different corresponding modulated watermark carriers (e.g., one for logical "1" and one for logical "0") for each different selected location. Similarly, if the set of watermark carriers generated during carrier generation were known to the watermark recovery system 400, then the coded watermark data could be recovered based on a recorded set of information that includes only the selected locations, where the watermark recovery system 400 tests each modulated version of each different watermark carrier for each selected location to determine the value of the corresponding bit of the coded watermark data.

The processing indicated in FIG. 4 shows yet another possible implementation of a watermark recovery method. In one embodiment, in addition to the set of watermark carriers generated during carrier generation, the watermark insertion method (e.g., embodied in watermark insertion system 200) records the results of region classification performed by the region classifier 204 (e.g., the set of available locations and their corresponding watermark carriers), as well as the secret watermark key for each different watermarked version of the input video work. As indicated in FIG. 4, the secret watermark key is applied to a secure random number generator (206 in FIG. 2) to reconstruct the same sequence of values used by the location selector 408 to select from the recorded set of available locations. Carrier demodulation (e.g., performed by carrier demodulator 410) would then involve testing each modulated version of the corresponding watermark carrier for each selected location identified by the location selector 408 to recover the coded watermark data. The watermark decoder 412 then decodes, as required by the associated encoding process implemented by the watermark encoder 212. For example, the watermark decoder 212 may apply a Viterbi decoder to correct for bit errors and then decrypt with a secret cipher key.

Here, too, in an alternative implementation, if the set of available watermark carriers is known, the data recorded during the watermark insertion processing need not explicitly include identification of the corresponding watermark carriers. In such a case, carrier demodulation could test each modulated version of each different watermark carrier at each selected location identified by the location selector 408 to recover each but of watermark data.

Alternative Embodiments

In one embodiment, both the (unmarked) input video work and the (marked) output video work are digital video bitstreams. In other embodiments, one or both of the input and output video works could be analog video signals.

In some embodiments, the modulated watermark carriers are added to the luminance (e.g., brightness) pixel data; for example, in a conventional YUV or YCrCb color space, the watermark carriers are added to the Y channel. In other embodiments, modulated watermark carriers could be applied to the color components of the data instead of or in addition to being applied to the brightness component. Moreover, the present invention can also be implemented in color spaces that do not have specific luminance data, such as a conventional RGB color space, where the modulated watermark carriers could be added to any combination of the red, green and/or blue pixel data.

In some embodiments, the watermark carriers are 3D spatio-temporal Gaussian functions having a peak value at some specified (x, y, t) location and whose amplitude falls off in all temporal and spatial directions form that location. In other embodiments similar to embodiments described previously herein, the watermark carriers are 3D spatio-temporal patterns having rectilinear shapes in the 3D video space. In still further embodiments, 3D spatio-temporal patterns having shapes other than rectilinear can be used as watermark carriers, including, but not limited to, cylindrical, elliptical or spherical shapes. Furthermore, one or more of the watermark carriers could be one-dimensional, where each pattern corresponds to a one-dimensional curve (including a straight line) in the 3D video space. Similarly, one or more of the watermark carriers could be two-dimensional, where the pattern corresponds to a 3D curvilinear surface (including a flat plane) in the 3D video space. Depending on the particular watermark carrier, the one- or two-dimensional patterns could be orientated in any possible manner with respect to the x (height), y (width) and t (duration) axes of the 3D video space. In addition, watermark carriers could correspond to either contiguous or non-contiguous sets of pixels, whether those sets form one-, two- or three-dimensional patterns.

Although the present invention has been described in the context of a video frame as a single entity, those skilled in the art will appreciate that the invention can also be applied in the context of interlaced video works and associated field processing. As such, unless clearly inappropriate for the particular implementation described, the term "frame", as used herein, should be interpreted to cover applications both for video frames and video fields.

Although the present invention has been described in terms of video data, the present invention could also be implemented in the context of audio data.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, a micro-controller, or a general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein the program code is loaded into and executed by a machine, such as a computer, and the machine thereby becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine thereby becomes an apparatus for practicing the invention. When implemented on a general-purpose processor, the program code segments combine with the processor to provide a unique device that operates analogously to specific logic circuits.

Asymmetric Watermark Carriers

In one embodiment, a low-frequency, temporally asymmetric spatio-temporal watermark carrier that may be used in accordance with the method and apparatus described previously herein is an at least partially Gaussian function that increases and decreases in luminance in a substantially monotonic manner to form a low-frequency, substantially smooth curve. The asymmetric watermark carrier is defined by its location (x, y, t) in the 3D video space and by its standard deviations ($\sigma x$, $\sigma y$, $\sigma t$) along each of the three dimensions. Operation of the asymmetric watermark carrier is based on the observation that the human visual system tends to detect images getting darker more readily than it detects images getting lighter.

In one embodiment, the location for the asymmetric watermark carrier is selected in accordance with the method described above, and the particular spatio-temporal Gaussian low-pass watermark carrier to be inserted is selected based on a combination of three properties: (1) specific design objectives for the particular application; (2) known characteristics of real images; and (3) measured sensitivity of the human visual system. In one embodiment, a specific design objective is robustness against video camcorder capture, as discussed previously herein.

Figure 5:
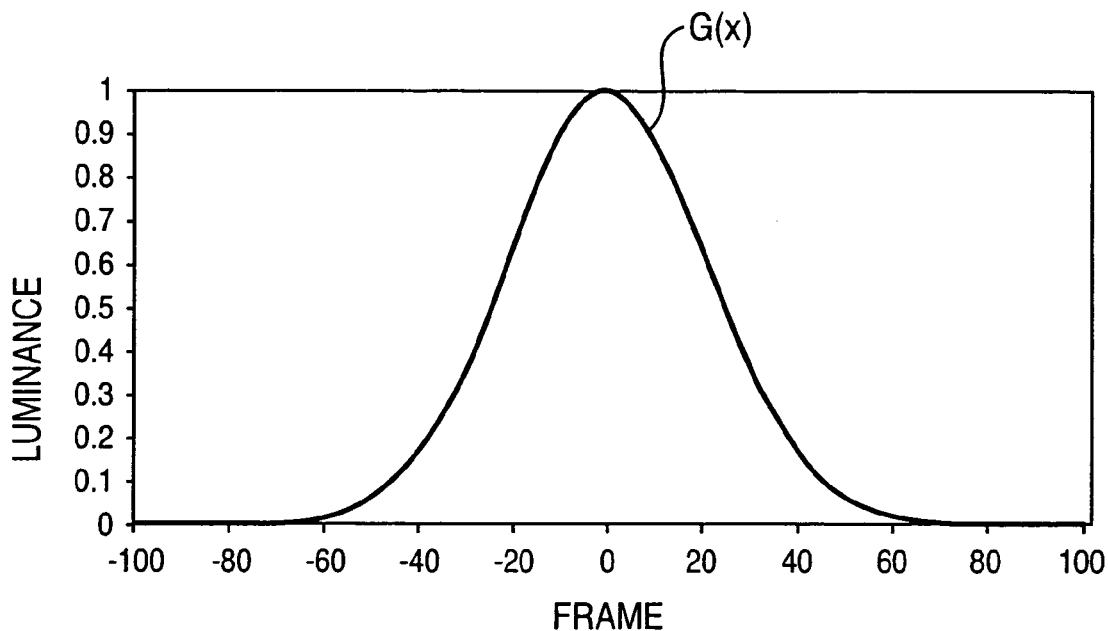
FIG. 5 is a graph illustrating the time dimension of one embodiment of a symmetric Gaussian watermark carrier.

FIG. 5 is a graph illustrating the time dimension of one embodiment of a symmetric Gaussian watermark carrier G(x), e.g., similar to the watermark carriers discussed with reference to the preceding Figures. In the embodiment illustrated in FIG. 5, the carrier G(x) is a positive sign carrier (e.g., the carrier increases in luminance to a peak before decreasing). Frame 0, on the x axis, represents the location of the carrier G(x) in a 3D video volume of a 200-frame window. In the embodiment illustrated, the carrier G(x) has a standard deviation of thirty frames. The carrier G(x) is substantially symmetric; that is, the luminance, as measured along the y axis, increases (e.g., frames –100 to 0) at substantially the same rate as it decreases (e.g., frames 0 to 100), making the onset and the decay functions symmetrical about the frame 0. In this symmetric function, the decay of the carrier G(x) may potentially be more visible to the human eye that the onset.

Figure 6:
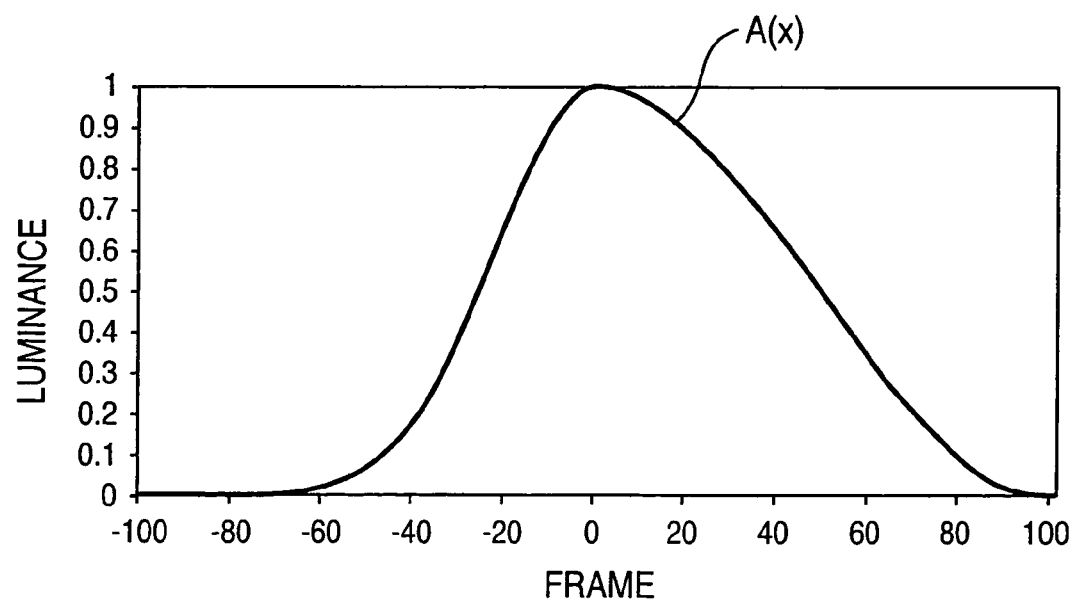
FIG. 6 is a graph illustrating the time dimension of an asymmetric watermark carrier, according to one embodiment of the present invention.

FIG. 6, on the other hand, is a graph illustrating the time dimension of a low-frequency asymmetric watermark carrier, A(x), according to one embodiment of the present invention. Like the carrier G(x), the carrier A(x) has a positive sign and a standard deviation of thirty frames. The asymmetry of the carrier A(x) stems from the fact that although the carrier's onset, or ascending phase (e.g., frames –100 to 0), follows a substantially Gaussian function, the decay, or the descending phase (e.g., frames 0 to 100), follows a raised cosine function. Thus, the carrier A(x) decays (or darkens) at a slower rate than the carrier G(x) over the same number of frames. The illustrated curve representing the carrier A(x) monotonically increases and decreases: that is, the respective portions of the curve (e.g., the ascending and descending phases) either increase or decrease consistently, but do not oscillate substantially in relative value. However, though the curve representing the carrier A(x) is illustrated as being substantially smooth, those skilled in the art will appreciate that the curve may be dithered, or slightly modulated, along all or part of its length.

As discussed, operation of the asymmetric watermark carrier A(x) is based on the observation that the human visual system tends to detect images getting darker more readily than it detects images getting lighter. Thus, if a watermark in watermarked video content darkens at a slower rate than it lightens, the presence of the watermark over a series of successive frames will be less noticeable to the human eye (e.g., will be substantially invisible) than a watermark that lightens and darkens at substantially equal rates. This is particularly significant for applications in which high frequency signals are likely to be attenuated by pirated video content, such as when the pirated content is an exhibition recorded by a video camcorder.

Figure 7:
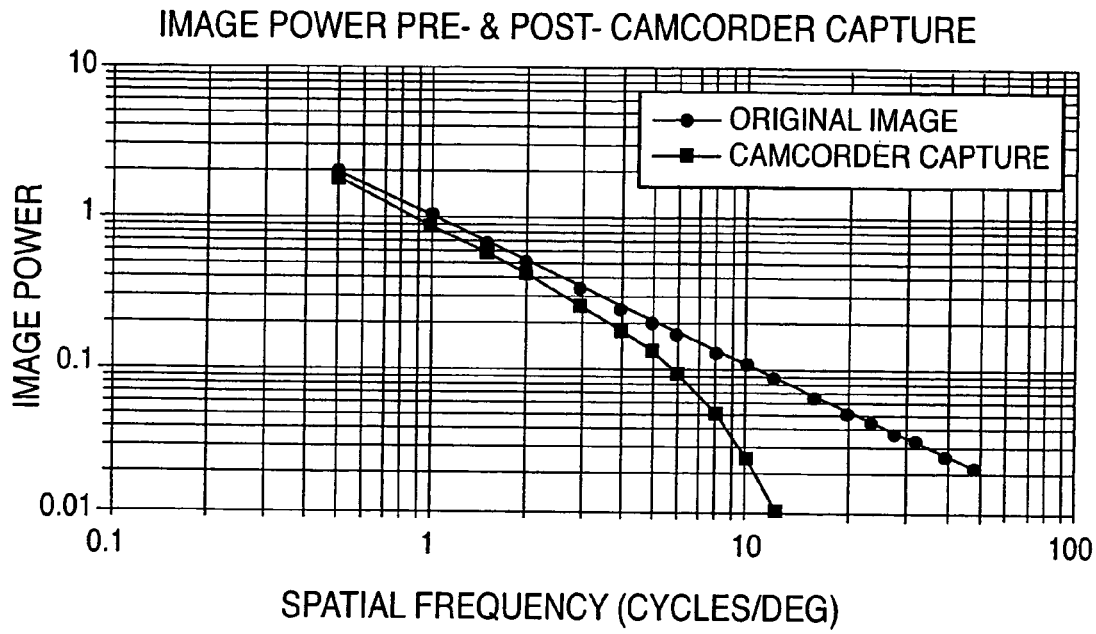
FIG. 7 is a graph illustrating the power spectrum of a hypothetical image having a characteristic 1/F shape.

FIG. 7 is a graph illustrating the power spectrum of a hypothetical image having a characteristic 1/F shape as described in D. J. Field,. "Relations Between the Statistics of Natural Images and the Response Profiles of Cortical Cells," Journal of the Optical Society of America, A(4), pp. 2379-2394 (1987), which is herein incorporated by reference. The hypothetical image represents a video frame or field into which a watermark carrier of the present invention may be applied.

As illustrated in FIG. 7, image power tends to decrease in a substantially linear fashion for the original image as the spatial frequency increases. However, in the case where the hypothetical image has been captured by a video camcorder, a much more dramatic drop in image power is observed for the corresponding values of spatial frequency relative to the original image data. As one can infer from FIG. 7, the captured image behaves as a low-pass filter, which attenuates high frequency signals, thereby substantially removing any watermarks in the original image that have high frequency content.

Figure 8:
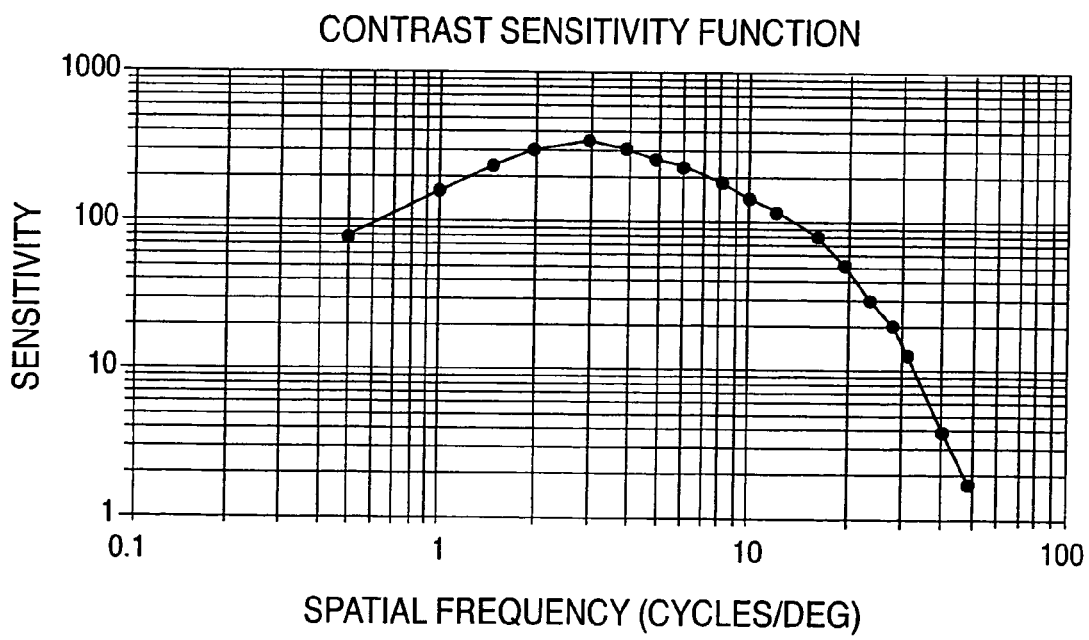
FIG. 8 is a graph illustrating human visual contrast sensitivity as a function of spatial frequency.

FIG. 8 is a graph illustrating human visual contrast sensitivity as a function of spatial frequency. As illustrated, humans tend to be less sensitive to lower frequency targets (e.g., images) than they are to higher frequency targets. Moreover, those skilled in the art will appreciate that real images typically have higher low-frequency energy than high-frequency energy. Thus, it is easier to hide a low-pass watermark in the low-frequency image content of a real image than it is to hide the low-pass watermark in the high-frequency image content. The ability to hide a low-frequency watermark carrier in a real image is therefore greater than the ability to hide a high-frequency watermark carrier in the same image. Hiding a lower frequency watermark in the image also provides for increased embedding strength at an equal detection threshold.

Thus, according to one embodiment of the present invention, a watermark message is used to modulate the sign of a watermark carrier. At a specified neighborhood in space and time, the luminance values of a video image are deflected from their original values based on the sign and spatio-temporal structure of the carrier. In one embodiment, the specified neighborhood is a three-dimensional ellipsoid centered at the carrier location, and the axis length along each of the three dimensions is six times the standard deviation of a Gaussian function embodied in the carrier. The magnitude of the deflection is proportional to the value of the carrier at each corresponding location in space and time. The signs of the deflections are all the same for a given carrier and are determined by the corresponding watermark message bit (e.g., logical "1", logical "0", etc.). The resulting watermarked video content has substantially smooth-edged, disk-shaped spatial regions that slowly lighten and then darken back to their nominal luminance values.

Figure 9:
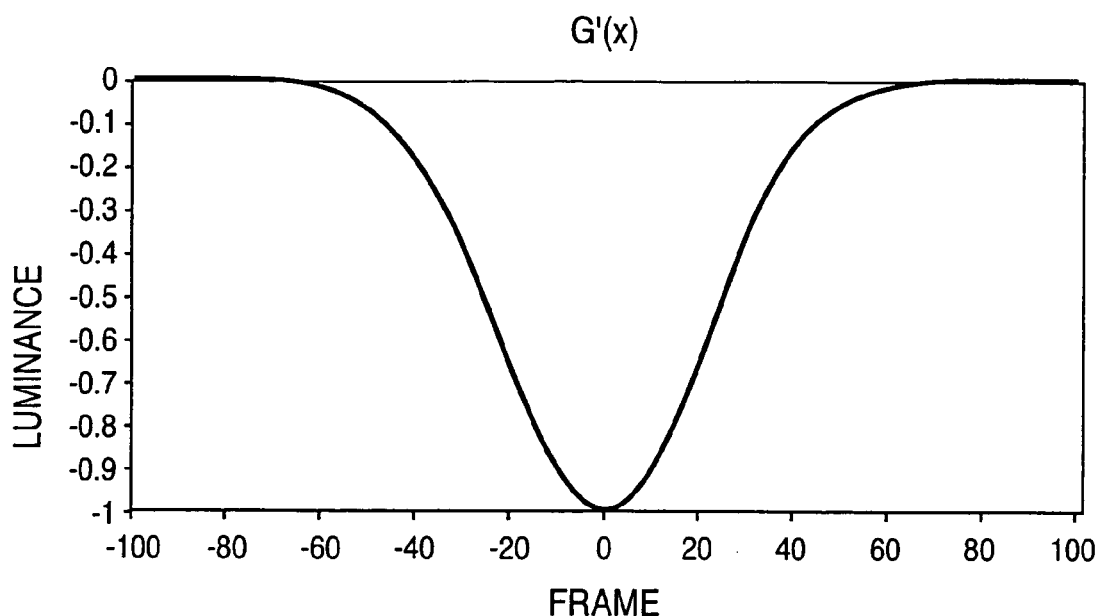
FIG. 9 is a graph illustrating the time dimension of one embodiment of a symmetric Gaussian watermark carrier.

In another embodiment of the present invention, an asymmetric watermark carrier A'(x) has a negative sign. FIG. 9 is a graph illustrating the time dimension of one embodiment of a symmetric Gaussian watermark carrier G'(x), e.g., similar to the watermark carriers discussed with reference to the FIGS. 1-4. In the embodiment illustrated in FIG. 9, the carrier G'(x) is a negative sign carrier (e.g., the carrier decreases in luminance to a peak before increasing). Frame 0, on the x axis, represents the location of the carrier G'(x) in a 3D video volume of a 200-frame window. In the embodiment illustrated, the carrier G'(x) has a standard deviation of thirty frames. The carrier G'(x) is substantially symmetric; that is, the onset function (e.g., frames −100 to 0) of the carrier G'(x) and the decay function (e.g., frames 0 to 100) are substantially symmetric about the frame 0. In this symmetrical function, the onset of the carrier G'(x) would be more visible to the human eye that the decay.

Figure 10:
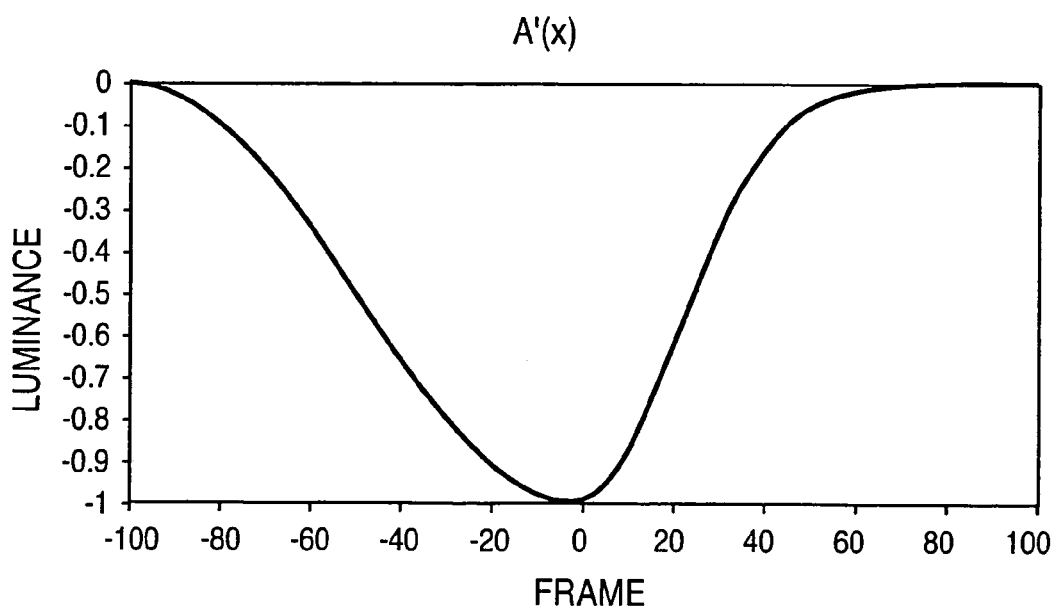
FIG. 10 is a graph illustrating the time dimension of an asymmetric watermark carrier, according to one embodiment of the present invention.

FIG. 10, on the other hand, is a graph illustrating the time dimension of a low-frequency asymmetric watermark carrier, A'(x), according to one embodiment of the present invention. Like the carrier G'(x), the carrier A'(x) has a negative sign and a standard deviation of thirty frames. The asymmetry of the carrier A'(x) stems from the fact that although the carrier's onset (e.g., frames −100 to 0) follows a raised cosine function, the decay (e.g., frames 0 to 100) follows a substantially Gaussian function. Thus, the carrier A'(x) darkens at a slower rate than the carrier G'(x) over the same number of frames. Those skilled in the art will appreciate that the carrier A'(x) is only one of an infinite number of functions that increase in value more quickly than they decrease in value. Although the curve representing the carrier A'(x) is illustrated as being substantially smooth, those skilled in the art will appreciate that the curve may be dithered, or slightly modulated, along all or part of its length.

Moreover, those skilled in the art will recognize that any spatial carrier (e.g., a two-dimensional Gaussian function) can be given an asymmetric temporal profile to yield a temporally asymmetric spatio-temporal watermark carrier. In one embodiment of the present invention yields two shapes: a first for positive sign carriers (e.g., FIG. 6) and a second for negative sign carriers (e.g., FIG. 10). At the time that the watermark carriers are embedded in video content, the carrier corresponding to the corresponding watermark message bit (e.g., logical "1" or logical "0") will be selected.

Figure 11:
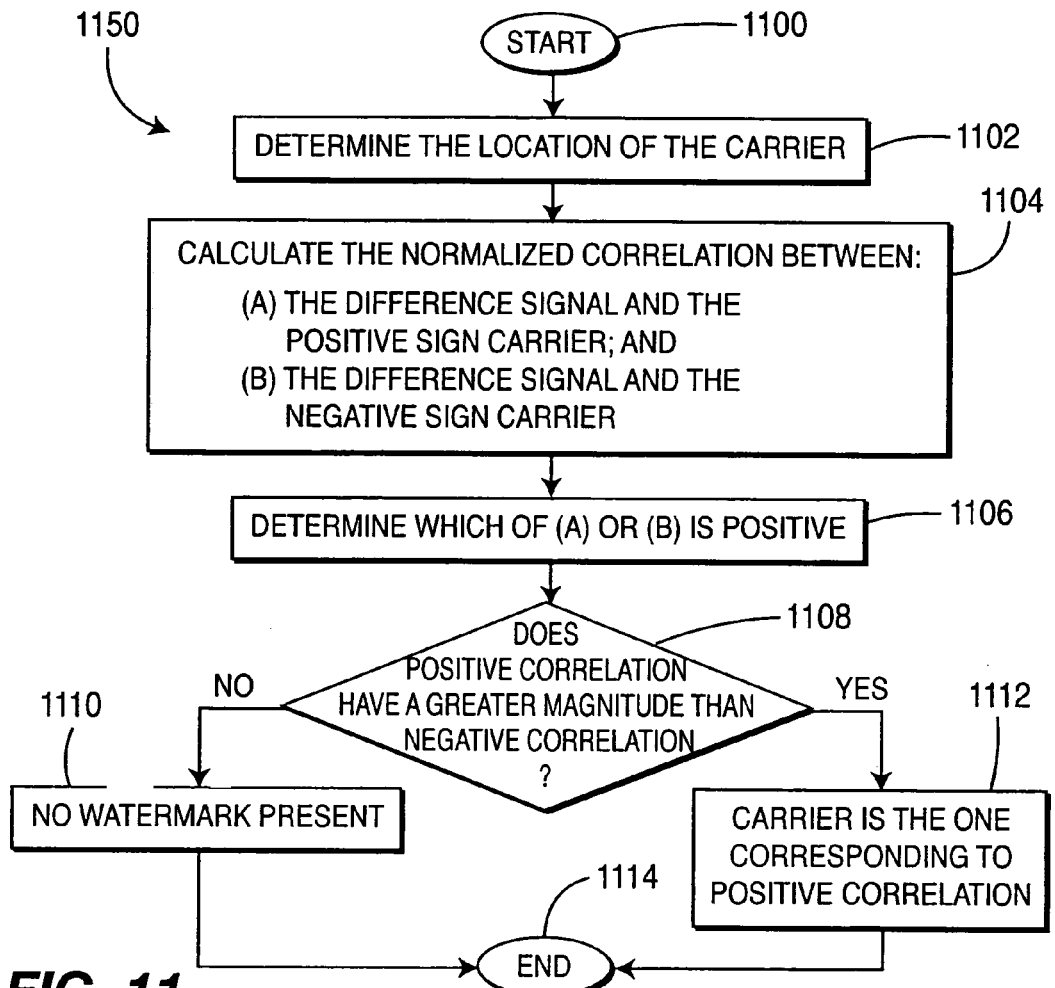
FIG. 11 is a flow diagram illustrating one embodiment of a method for detecting an asymmetric watermark carrier, according to the present invention.

FIG. 11 is a flow diagram illustrating one embodiment of a method 1150 for detecting an asymmetric watermark carrier (e.g., carriers A(x) or A'(x)) according to the present invention. In one embodiment, detection of an asymmetric watermark carrier is somewhat more complicated than detection of a symmetric carrier, since the sign and exact shape of the embedded carrier is unknown. In one embodiment, if the location of the carrier is known, one can test for both the positive and negative sign carriers.

In one embodiment, the method 1150 is similar to the process described with reference to FIG. 4. The method 1150 is initialized at step 1100 and proceeds to step 1102, where the method 1150 determines the location of the carrier. Once the carrier location is know, the method 1150 proceeds to step 1104 and calculates the normalized correlation between a difference signal and the positive sign carrier (e.g., A(x)), as well as the normalized correlation between the difference signal and the negative sign carrier (e.g., A'(x)). In one embodiment, the difference signal is calculated by determining the difference, in a neighborhood around the center location, between the spatio-temporally registered original video work and the histogram registered work that is being analyzed for watermark extraction, e.g., as described previously herein.

In step 1106, the method 1150 determines which of the normalized correlations calculated in step 1104 has a positive value; one of the correlations will have a positive value, and the other will have a negative value. The method 1150 then proceeds to step 1108 and determines whether the normalized correlation having the positive value is greater in magnitude than the correlation having the negative value. If a watermark has been embedded in the analyzed work, the positive correlation will have a larger magnitude than the negative correlation. Thus, if the method 1150 determines in step 1108 that the positive correlation value does not have the greater magnitude, the method 1150 concludes in step 1110 that no watermark is present in the work being analyzed.

Alternatively, if the method 1150 determines that the positive correlation value does have a greater magnitude than the negative correlation value, the method 1150 proceeds to step 1112 and concludes that a watermark does exist in the analyzed work and that the watermark bit extracted from the particular carrier location is the bit corresponding to the carrier (e.g., A(x) or A'(x)) associated with the positive correlation. The method 1150 then terminates in step 1114.

Figure 12:
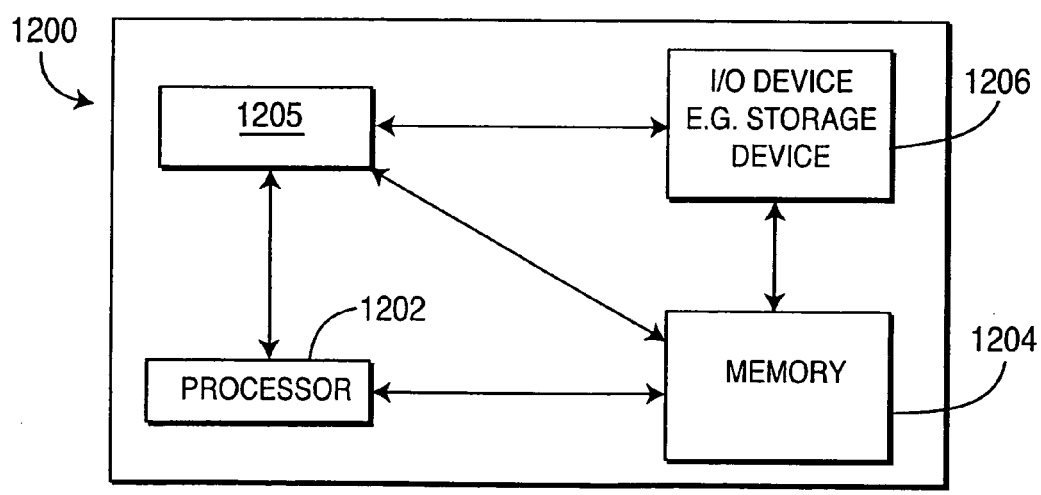
FIG. 12 is a high level block diagram of the present method for detecting asymmetric watermark carriers that is implemented using a general purpose computing device.

FIG. 12 is a high level block diagram of the present method for detecting asymmetric watermark carriers that is implemented using a general purpose computing device 1200. In one embodiment, a general purpose computing device 1200 comprises a processor 1202, a memory 1204, an asymmetric watermark carrier detection module 1205 and various input/output (I/O) devices 1206 such as a display, a keyboard, a mouse, a modem, and the like. In one embodiment, at least one I/O device is a storage device (e.g., a disk drive, an optical disk drive, a floppy disk drive). It should be understood that the asymmetric watermark carrier detection module 1205 can be implemented as a physical device or subsystem that is coupled to a processor through a communication channel.

Alternatively, the asymmetric watermark carrier detection module 1205 can be represented by one or more software applications (or even a combination of software and hardware, e.g., using Application Specific Integrated Circuits (ASIC)), where the software is loaded from a storage medium (e.g., I/O devices 1206) and operated by the processor 1202 in the memory 1204 of the general purpose computing device 1200. Thus, in one embodiment, the asymmetric watermark carrier detection module 1205 for detecting an asymmetric watermark carrier, e.g., in a video work, described herein with reference to the preceding Figures can be stored on a computer readable medium or carrier (e.g., RAM, magnetic or optical drive or diskette, and the like).

Thus, the present invention represents a significant advancement in the field of video processing. A watermark carrier is provided that, when embedded in an original work, will darken more slowly than it will lighten, thereby enabling the corresponding watermark to be rendered substantially unnoticeable to the human eye. The low-frequency, temporally asymmetric watermark has particular significance for applications in which elements of a pirated work enable the pirated images to effectively filter out high-frequency visual content (e.g., where the pirated work is a camcorder capture of an original exhibition), as the inventive watermark is resistant to such filtering techniques.

While the foregoing is directed to embodiments of the invention, other and further embodiments of the invention may be devised without departing from the basic scope thereof, and the scope thereof is determined by the claims that follow.

What is claimed is:

1. A method for inserting watermark data into a video work, the method comprising:
    selecting a location in said video work for inserting said watermark data; and
    applying a temporally asymmetric watermark carrier to the selected location, wherein said temporally asymmetric watermark carrier decreases in luminance at a slower rate than it increases in luminance;
    wherein said temporally asymmetric watermark carrier decreases in luminance and then increases in luminance.

2. The method of claim 1, wherein said temporally asymmetric watermark carrier is a negative carrier.

3. The method of claim 1, wherein said temporally asymmetric watermark carrier is a low-frequency carrier.

4. The method of claim 1, wherein said temporally asymmetric watermark carrier is embodied as a substantially smooth curve representing luminance over time.

5. The method of claim 1, wherein a standard deviation of said temporally asymmetric watermark carrier is thirty frames of a video stream contained in said video work.

6. The method of claim 1, wherein said temporally asymmetric watermark carrier is at least partially dithered.

7. The method of claim 1, wherein the temporally asymmetric watermark is secure against unauthorized watermark embedding.

8. The method of claim 1 wherein selecting a location in said video work for inserting said watermark data is performed in real time.

9. The method of claim 1, wherein applying a temporally asymmetric watermark carrier to the selected location is performed in real time.

10. The method of claim 1, wherein the temporally asymmetric watermark carrier comprises a unique set of watermark data each time the video work is exhibited.

11. The method of claim 10, wherein the temporally asymmetric watermark carrier comprises information about the time the video work is exhibited.

12. The method of claim 10, wherein the temporally asymmetric watermark carrier comprises information about a location where the video work is exhibited.

13. The method of claim 1, wherein applying a temporally asymmetric watermark carrier to the selected location comprises applying a temporally asymmetric watermark carrier that is substantially invisible to a viewer of the video work.

14. The method of claim 13, wherein the substantially invisible temporally asymmetric watermark carrier is visible upon insertion of one or more overlapping watermarks.

15. The method of claim 1, further comprising generating one or more temporally asymmetric watermark carriers.

16. The method of claim 15, wherein generating one or more temporally asymmetric watermark carriers comprises generating one or more temporally asymmetric watermark carriers modulated to encode the watermark data so that the watermark data is preserved when the video work is copied by a camcorder or other recording/capture medium.

17. The method of claim 15, wherein generating one or more temporally asymmetric watermark carriers comprises generating one or more temporally asymmetric watermark carriers modulated to encode the watermark data so that the watermark data is preserved when the video work is subject to normal processing degradations.

18. An apparatus for encoding watermark data into a video work, comprising:
    a location selector configured for selecting a location in the video work for encoding watermark data; and
    a watermark applicator configured for applying a temporally asymmetric watermark carrier to the selected location, wherein said temporally asymmetric watermark carrier decreases in luminance at a slower rate than it increases in luminance;
    wherein said temporally asymmetric watermark carrier decreases in luminance in a Gaussian manner and then increases in luminance in a Gaussian manner.

19. A method for detecting a watermark carrier in a video work, said method comprising:
    determining the location of said watermark carrier, wherein said watermark carrier is a temporally asymmetric watermark carrier that decreases in luminance at a slower rate than it increases in luminance;
    calculating a first normalized correlation for a positive version of said temporally asymmetric watermark carrier;
    calculating a second normalized correlation for a negative version of said temporally asymmetric watermark carrier; and
    analyzing said first and second normalized correlations to determine whether a watermark is present in said video work.

20. The method of claim 19, wherein said analyzing comprises:
    determining which of said first and second normalized correlations has a positive value and which of said first and second normalized correlations has a negative value;
    determining whether the normalized correlation having the positive value has a greater magnitude than the normalized correlation having the negative value; and
    concluding that a watermark carrier present in said video work corresponds to the version of said temporally asymmetric watermark carrier that corresponds to the normalized correlation having the positive value.

21. The method of claim 19 wherein the asymmetric watermark carrier increases in luminance and then decreases in luminance.

22. The method of claim 19 wherein the asymmetric watermark carrier decreases in luminance and then increases in luminance.

23. An apparatus for inserting watermark data into a data stream, the apparatus comprising:
    means for selecting a location in said data stream for inserting said watermark data; and
    means for applying a temporally asymmetric watermark carrier to the selected location, wherein said temporally asymmetric watermark carrier decreases in luminance in a substantially monotonic manner at a different rate than it increases in luminance in a substantially monotonic manner;
    wherein said temporally asymmetric watermark carrier decreases in luminance and then increases in luminance, wherein said temporally asymmetric watermark carrier decreases in luminance at a slower rate than said temporally asymmetric watermark carrier increases in luminance.

24. An apparatus for detecting a watermark carrier in a video work said apparatus comprising:
- means for determining the location of said watermark carrier, wherein said watermark carrier is a temporally asymmetric watermark carrier that decreases in luminance at a slower rate than it increases in luminance;
- means for calculating a first normalized correlation for a positive version of said temporally asymmetric watermark carrier;
- means for calculating a second normalized correlation for a negative version of said temporally asymmetric watermark carrier; and
- means for analyzing said first and second normalized correlations to determine whether a watermark is present in said data stream.

25. The apparatus of claim 24, wherein said positive version of said temporally asymmetric watermark carrier encodes a logical "1" bit of watermark data.

26. The apparatus of claim 24, wherein said negative version of said temporally asymmetric watermark carrier encodes a logical "0" bit of watermark data.

27. The apparatus of claim 24, wherein determining the location of said watermark carrier comprises:
- generating an extracted watermark by subtracting a reference video work from a pirated video work;
- comparing the extracted watermark to a noisy map comprising a plurality of embedded modulated watermark carriers; and
- determining the location of said watermark carrier based in part on the noisy map.

28. The apparatus of claim 27, wherein determining the location of said watermark carrier based in part on the noisy map comprises comparing the noisy map to a matched filter for said watermark carrier.

29. The apparatus of claim 27, wherein determining the location of said watermark carrier based in part on the noisy map comprises comparing the noisy map to a set of recorded information, wherein the set of recorded information comprises a location recorded during watermark location selection and a watermark carrier recorded during watermark location selection.

30. The apparatus of claim 29, wherein the set of recorded information further comprises watermark data recorded during watermark location selection.

31. A method for inserting watermark data into a video work, the method comprising:
- selecting a location in said video work for inserting said watermark data; and
- applying a temporally asymmetric watermark carrier to the selected location, wherein said temporally asymmetric watermark carrier decreases in luminance at a slower rate than it increases in luminance;
- wherein said temporally asymmetric watermark carrier is a negative carrier; and
- wherein said temporally asymmetric watermark carrier is configured with a boundary that corresponds to at least one edge in the video work.

32. A computer program product comprising:
- a computer-usable medium having computer-readable code embodied therein for loading into and execution by a computer, the computer-readable code comprising:
- selecting a location in a video work for inserting watermark data; and
- applying a temporally asymmetric watermark carrier to the selected location, wherein said temporally asymmetric watermark carrier decreases in luminance at a slower rate than it increases in luminance, wherein said temporally asymmetric watermark decreases in luminance and then increases in luminance.

* * * * *